United States Patent
Regnier

(10) Patent No.: US 7,831,814 B2
(45) Date of Patent: *Nov. 9, 2010

(54) MONITORING A MICROPROCESSOR PROGRAMME BY SENDING TIME-TRACKABLE MESSAGES

(75) Inventor: Laurent Regnier, Gieres (FR)

(73) Assignee: STMicroelectronics S.A., Montrouge (FR)

( * ) Notice: Subject to any disclaimer, the term of this patent is extended or adjusted under 35 U.S.C. 154(b) by 118 days.

This patent is subject to a terminal disclaimer.

(21) Appl. No.: 10/531,610

(22) PCT Filed: Oct. 29, 2002

(86) PCT No.: PCT/FR02/03724

§ 371 (c)(1),
(2), (4) Date: Apr. 14, 2005

(87) PCT Pub. No.: WO2004/042579

PCT Pub. Date: May 21, 2004

(65) Prior Publication Data

US 2006/0155970 A1    Jul. 13, 2006

(51) Int. Cl.
G06F 9/00 (2006.01)
(52) U.S. Cl. .................................................. 712/227
(58) Field of Classification Search .............. 712/227; 714/30, 31
See application file for complete search history.

(56) References Cited

U.S. PATENT DOCUMENTS

| | | | |
|---|---|---|---|
| 4,574,354 A * | 3/1986 | Mihalik et al. ............. 702/189 |
| 5,237,684 A | 8/1993 | Record et al. | |
| 5,594,864 A * | 1/1997 | Trauben ..................... 714/39 |
| 5,621,663 A | 4/1997 | Skagerling | |
| 5,642,478 A * | 6/1997 | Chen et al. .................... 714/45 |
| 5,764,885 A * | 6/1998 | Sites et al. ................... 714/45 |
| 5,848,264 A * | 12/1998 | Baird et al. .................. 703/28 |

(Continued)

FOREIGN PATENT DOCUMENTS

EP      1 184 790 A2    3/2002

(Continued)

OTHER PUBLICATIONS

Okeeffe, H. et al., *Einheitliche Debug-Schnittstelle Der Zukunft Der Nexus-Standard Soll Die Kommunikation Zwischen Emulator Und Prozessor Vereinheitlichen*, Elektronik, Franzis Verlag GMBH, Munchen, vol. 49, No. 18, Sep. 5, 2000, pp. 124-128, XP001107530.

(Continued)

*Primary Examiner*—Jacob Petranek
(74) *Attorney, Agent, or Firm*—Lisa K. Jorgenson; James H. Morris; Wolf, Greenfield & Sacks, P.C.

(57) ABSTRACT

The invention concerns a monitoring device (18', 18") integrated to the chip of a microprocessor (12) executing a series of instructions comprising message calculating means (36) for upon each execution of an instruction, producing a corresponding digital message; a buffer memory (34) for storing each message produced; and a plurality of output terminals (FA, FB, FC) connected to an external analyzing tool (24), each output terminal (FA, FB, FC) being associated with one type of instructions; the message calculating means (36) modifying the state of the output terminal (FA, FB, FC) associated with one type of instructions at the time when a message corresponding to said type of instructions is stored in the buffer memory.

19 Claims, 2 Drawing Sheets

U.S. PATENT DOCUMENTS

| | | | |
|---|---|---|---|
| 5,996,092 | A | 11/1999 | Augsburg et al. |
| 6,167,536 | A | 12/2000 | Mann |
| 6,332,117 | B1 | 12/2001 | Berry et al. |
| 6,467,083 | B1 * | 10/2002 | Yamashita ................. 717/128 |
| 6,519,766 | B1 | 2/2003 | Barritz et al. |
| 6,918,065 | B1 * | 7/2005 | Edwards et al. ............... 714/45 |
| 7,080,283 | B1 * | 7/2006 | Songer et al. ................. 714/30 |
| 7,080,289 | B2 * | 7/2006 | Swaine et al. ................. 714/45 |

OTHER PUBLICATIONS

Macnamee, C., *Ein Interface Fuer Alle Nexus Als Globaler Debug-Standard*, Elektronikpraxis, Vogel, Wuerzburg, No. 3, Feb. 8, 2000, pp. 104-108, XP008001346.

Schmitt, W., *Nexus—Debug Konzept Der Zukunft? Universelle Emulations-Und Kalibrierschnittstelle Fuer Mikrocontroller*, Elektronik, Franzis Verlag GMBH, Munchen, vol. 48, No. 17, Aug. 24, 1999, pp. 52-59, XP000931028.

* cited by examiner

MONITORING A MICROPROCESSOR PROGRAMME BY SENDING TIME-TRACKABLE MESSAGES

BACKGROUND OF THE INVENTION

1. Field of the Invention

The present invention relates to the testing of microprocessors. It more specifically relates to a device and a method for transmitting from a monitoring circuit integrated in a microprocessor chip dated digital messages enabling tracing the microprocessor operation.

2. Discussion of the Related Art

FIG. 1 schematically shows an integrated circuit 10 comprising a microprocessor (μP) 12, an internal memory (MEM) 14, and input/output terminals (I/O) 16. Microprocessor 12 is intended to execute a program or a software stored in memory 14. Under control of the program, microprocessor 12 may process data provided by input/output terminals 16 or stored in memory 14 and read or write data through input/output terminals 16.

To check the proper operation of the microprocessor, a monitoring circuit 18 (TEST) is generally integrated to integrated circuit 10. Monitoring circuit 18 is capable of reading specific data provided by microprocessor 12 on execution of a program, and of possibly processing the read data. Test terminals 22 connect monitoring circuit 18 to an analysis tool 24. Analysis tool 24 may process the received signals, for example, according to commands provided by a user, and ensure a detailed analysis of the operation of microprocessor 12. In particular, analysis tool 24 may determine the program instruction sequence really executed by microprocessor 12.

The number of test terminals 22 may be on the same order of magnitude as the number of input/output terminals 16, for example, 200 to 400 terminals. Test terminals 22 as well as the connections of monitoring circuit 18 take up a significant silicon surface area, which causes an unwanted increase in the circuit cost. For this purpose, a first version of integrated circuit 10 comprising monitoring circuit 18 and test terminals 22 is produced in small quantities to debug the program of microprocessor 12 or "user program". After this debugging, a version of integrated circuit 10 rid of monitoring circuit 18 and of test terminals 22 is sold. This requires forming of two versions of the integrated circuit, which requires a significant amount of work and is relatively expensive. Further, the final chip is not necessarily identical to the tested chip.

To overcome the above-mentioned disadvantages, it is desired to form a monitoring circuit 18 which takes up a reduced surface area and only requires a reduced number of test terminals 22, which decreases the selfcost of the monitoring circuit. Monitoring circuit 18 can then be left on the finally sold integrated circuit 10.

It is thus desired to decrease the number of signals provided by monitoring circuit 18. For this purpose, certain logic operations are directly performed at the level of monitoring circuit 18 on the data measured at the level of microprocessor 12 to only transmit messages having an important information content.

Thus, standard IEEE-ISTO-5001 in process provides in its 1999 version a specific message exchange protocol between a monitoring circuit and an analysis tool for a monitoring circuit 18 requiring but a reduced number of test terminals 22.

The monitoring circuit is provided to monitor the operation of the microprocessor and to provide the test terminals with predetermined messages only corresponding to the execution of certain predetermined instructions. Several types of messages are provided, which correspond to the execution of instructions of different types. The different types of messages and their structure are described in section 6 of standard IEEE-ISTO-5001.

A great number of messages may be generated within a reduced time interval. The standard provides for each new message to be buffered when the test terminals are not available (when they are used to transmit another message), then to be sent to the analysis tool when the test terminals are available. When a message comprises more bits than there are test terminals, the standard provides for the message to be divided into segments of appropriate size, which are sequentially sent by the test terminals. Thus, the larger a message, the more time is required to send it to the analysis tool. The analysis tool is provided to reconstitute the microprocessor operation, that is, the program execution in the microprocessor, based on the received messages and on the program code. A problem results from the fact that, although the analysis tool easily determines the time elapsed between the reception of two messages, the analysis tool has no means to determine the time elapsed between the storage of these two messages. Indeed, the analysis tool receives each message at a reception time which has no relation with the time at which each message has been stored by circuit 18. Between the time at which a message is stored and the time at which this message is received by the analysis tool, the message remains in the buffer memory for a variable time period which depends on many factors, such as the size and the number of messages previously stored in the buffer memory. A given type of message provided by the terminal does indicate the number of instructions executed by the microprocessor since a previous message of the same type, but the speed at which the microprocessor executes the instructions varies from one instruction to the other, and the number of instructions executed between two messages just enables evaluating the time elapsed between these two messages. It is however desirable to accurately measure the time elapsed between the storage of two messages, especially to measure the execution time of certain critical portions of the microprocessor program.

To measure the time elapsed between the storage of two messages, a solution consists of including, in monitoring circuit 18, a counter rated at a predetermined frequency, with a counting that varies along time. It is enough to add in each message a data field containing the counting at the time when each message is stored to date this time. However, for such a dating to be sufficiently accurate, the counter must be rated at a high frequency. The counting thus very rapidly increases and the counter must have a large size not to be saturated. Such a counter takes up a significant surface area, which is not desirable. Further, the introduction of the counting in the messages substantially increases the message size. The messages comprising the counting must be divided into a large number of segments, the transmission of which monopolizes the test terminals for a long time, which is not desirable.

SUMMARY OF THE INVENTION

An object of the present invention is to provide a monitoring circuit according to standard IEEE-ISTO-5001 which enables measuring the time elapsed between two messages.

Another object of the present invention is to provide a monitoring method according to standard IEEE-ISTO-5001 which enables measuring the time elapsed between two messages.

To achieve these and other objects, the present invention provides a monitoring device integrated on the chip of a microprocessor executing a sequence of instructions, comprising: a message calculation means for, on each execution of an instruction from among a plurality of instructions of predetermined types, generating a digital message corresponding to the executed instruction; a buffer memory for storing each generated message; and a plurality of output terminals connected to an external analysis tool; each output terminal being associated with one of the instruction types and the message calculation means modifying the state of the output terminal associated with an instruction type at the time when a message corresponding to said instruction type is buffered.

According to an embodiment of the present invention, the buffer memory is divided into several areas, each of which is associated with a different instruction type and is intended to only store messages associated with said instruction type.

According to an embodiment of the present invention, each output terminal is connected to a test terminal.

According to an embodiment of the present invention, each output terminal is connected to an input terminal of a coding block comprising a predetermined number n of output terminals, each of which is connected to a test terminal; each coding block being provided to have each of its n output terminals switch once every n state switchings of its input terminal and so that a single one of its n output terminals switches state at once.

According to an embodiment of the present invention, certain types of instructions only are associated with an output terminal of the message calculation means.

According to an embodiment of the present invention, each of the possible instruction types is associated with an output terminal of the message calculation means.

The present invention also aims at an integrated circuit comprising a microprocessor and such a monitoring device.

The present invention also aims at a method for monitoring a microprocessor executing a sequence of instructions by means of a device integrated to the microprocessor chip, comprising the steps of:

on each execution of an instruction, generating a digital message corresponding to the executed instruction; and storing each generated message in a buffer memory; and modifying the state of one of a plurality of output terminals connected to an external analysis tool and each associated with an instruction type when a message corresponding to the instruction type to which said output terminal is associated is stored in the buffer memory.

BRIEF DESCRIPTION OF THE DRAWINGS

The foregoing and other objects, features, and advantages of the present invention will be discussed in detail in the following non-limiting description of specific embodiments in connection with the accompanying drawings, among which.

DETAILED DESCRIPTION

The present invention provides using several additional test terminals, switching state to directly indicate to the analysis tool the time at which messages of several predetermined types are stored in the buffer memory comprised in the device. For this purpose, the present invention provides dividing the buffer memory into several predetermined areas, each provided to receive messages of a given type from among several predetermined types, each area being associated with an additional test terminal connected to the analysis tool. When a new message is stored in one of the areas, the state of the additional test terminal associated with this area is modified.

Figure 1:
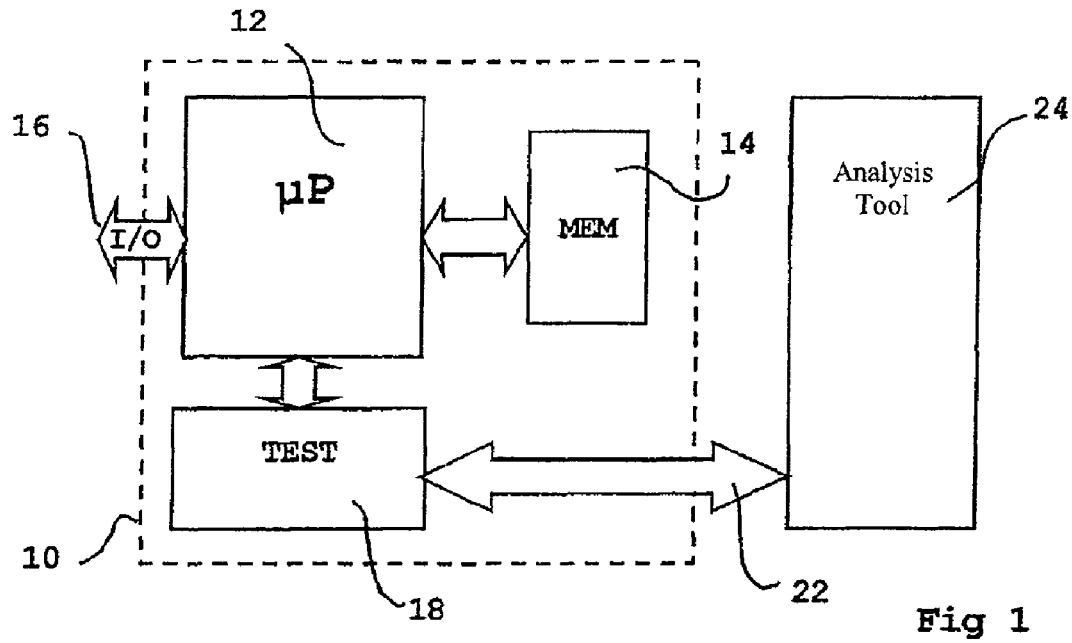
FIG. 1, previously described, schematically shows an integrated circuit provided with a monitoring device.
Figure 2:
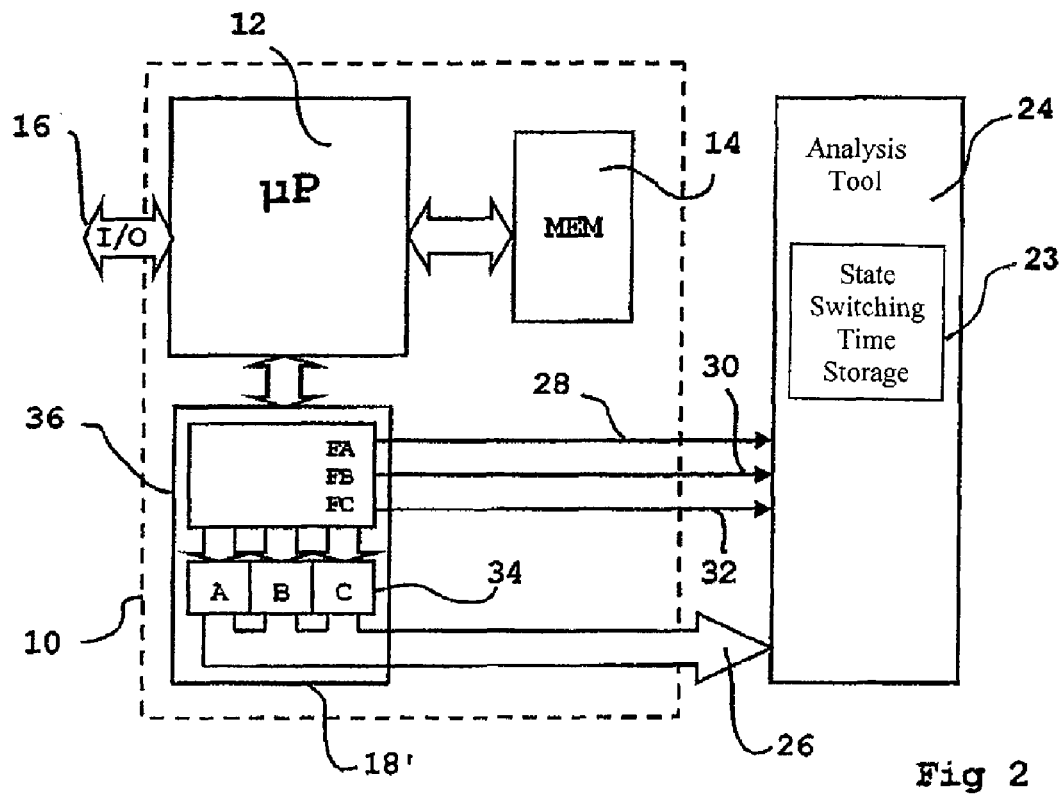
FIG. 2 schematically shows an integrated circuit provided with a monitoring device according to the present invention.

FIG. 2 schematically shows an integrated circuit 10 comprising as in FIG. 1 a microprocessor 12 connected to an internal memory 14 and to input/output terminals 16. Circuit 10 comprises a monitoring circuit 18' according to the present invention connected to microprocessor 12. Circuit 18' comprises a buffer memory 34 connected to analysis tool 24 via test terminals forming a parallel access 26. A calculation means 36 receiving information about the instructions executed by the microprocessor identifies the concerned instruction type and calculates messages provided by the terminal. Calculation means 36 is connected to buffer memory 34 and is connected to analysis tool 24 by additional test terminals 28, 30, and 32.

The predetermined instructions for which standard IEEE-ISTO-5001 provides that a message must be generated are of several types. To each instruction type corresponds a message type. Especially, standard IEEE-ISTO-5001 makes out instructions of program jump, of writing into the memory, and of reading form the memory, to which respectively correspond jump, write, and read messages. According to the present invention, memory 34 comprises an area A in which means 36 exclusively stores jump messages, an area B in which means 36 exclusively stores write messages, and an area C in which means 36 exclusively stores read messages. Such a division of the buffer memory into three areas for these three types of messages is given as an example only, and those skilled in the art will easily adapt the present invention to another division of the buffer memory.

According to the present invention, calculation means 36 comprises an output terminal FA connected to test terminal 28. Means 36 is provided to modify the value (1 or 0) of its output terminal FA (and of test terminal 28) each time means 36 stores a message in area A of buffer memory 34. Analysis tool 24 is provided to store the state switching times of test terminal 28, that is, the jump message storage times. The analysis tools thus knows that a first jump message received from buffer memory 34 has been generated and stored at the time of the first state switching of test terminal 28, and so on.

Similarly, means 36 comprises two output terminals FB and FC, respectively connected to test terminals 30 and 32, the value of which is modified each time means 36 stores a message respectively in area B or C of buffer memory 34.

The present invention thus enables the analysis tool to accurately date the generation and the storage of each type of message generated by calculation means 36 of analysis circuit 18'. The three additional test terminals 28, 30, and 32 and the means for actuating them provided by the present invention take up a reduced surface area with respect to the known dating counter, which is a first advantage of the present invention. The present invention further enables accurately dating the message storage time without increasing the message size, which is a second advantage of the present invention.

Certain microprocessors may be provided to execute in parallel several program instructions. For example, if the microprocessor program provides a program jump to an address obtained by a reading, the microprocessor may be provided to simultaneously execute the "read" instruction and the "jump" instruction. In such a case, means 36 generates a "jump" message, stores it in area A, and modifies the state of output terminal FA and, simultaneously, means 36 generates a "read" message, stores it in area C, and modifies the state of output terminal FC. The analysis tool thus accurately knows at what time a simultaneous storage occurs in areas A and C. It should be noted by those skilled in the art that it is important, for this purpose, for the storages in areas A and C to be indicated by the state switching of two separate output terminals. The present invention is thus particularly well adapted to the fact that the microprocessor can execute several program instructions or operations in parallel, which is an additional advantage of the present invention.

A problem may appear when the microprocessor rapidly executes, sequentially, a plurality of instructions of the same type. If for example the microprocessor sequentially executes several write instructions, each one in a clock cycle, write messages are sequentially stored in area B of the buffer memory at each clock cycle of the microprocessor. Output terminal FB then switches state with each message storage on each clock cycle of the microprocessor, which corresponds to an oscillation of output terminal FB at half the microprocessor operating frequency. Now, this frequency may be very high and it is possible for additional test terminal 30 connected to output terminal FB not to be designed to operate at such a frequency. As an illustration, the microprocessor may execute instructions at a 400-MHz frequency, and cause an oscillation of output terminal FB at 200 MHz, while test terminal 30 may, due to its structure, not operate beyond 100 MHz.

Figure 3:
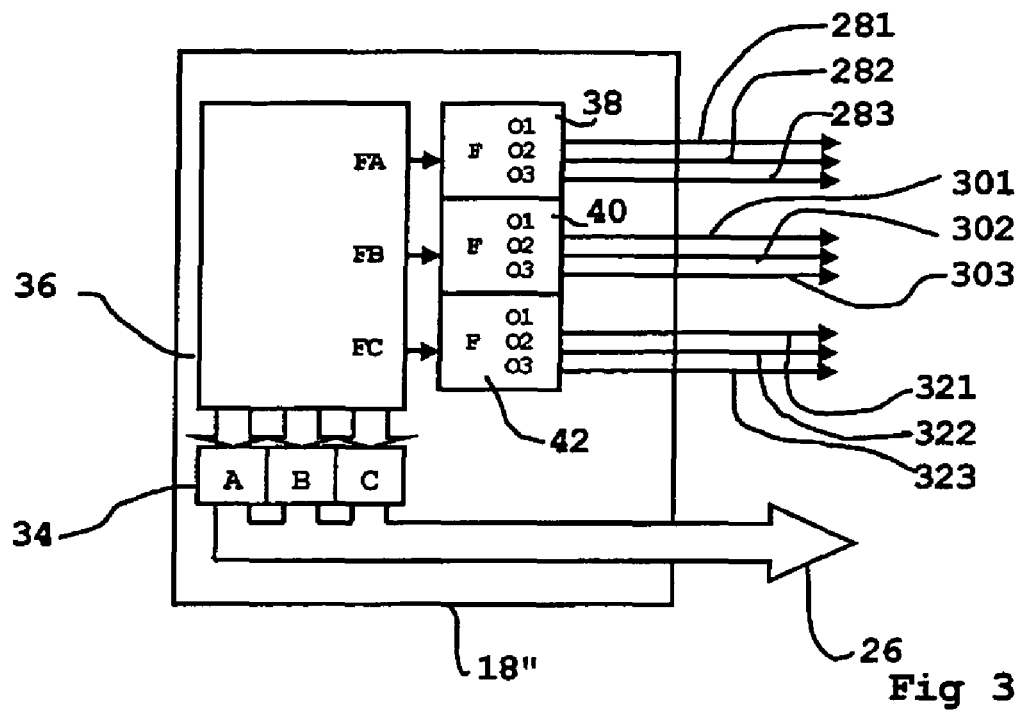
FIG. 3 schematically shows a monitoring device according to a variation of the present invention.

FIG. 3 schematically shows a monitoring circuit 18" provided to solve the above problem according to a variation of the present invention, comprising as circuit 18' of FIG. 2 a buffer memory 34 connected to a parallel access 26 and to a calculation means 36. The three output terminals FA, FB, and FC of means 36 are each connected to an input F of three identical coding blocks, respectively 38, 40, and 42. Each coding block comprises three output terminals O1, O2, O3. Output terminals O1, O2, and O3 of block 38 are connected to the analysis tool (not shown) by additional test terminals 281, 282, and 283. Output terminals O1, O2, O3 of coding blocks 40 and 42 are respectively connected to the analysis tool by additional test terminals 301, 302, 303 and 321, 322, 323.

Figure 4:
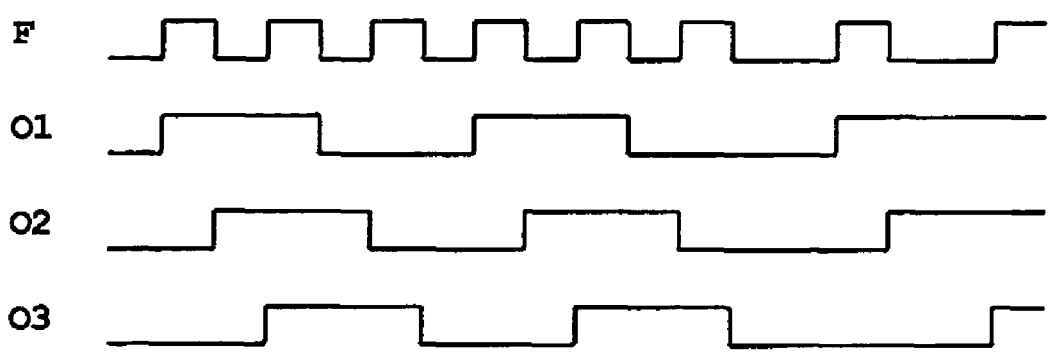
FIG. 4 illustrates the operation of a coding block of FIG. 3.

FIG. 4 illustrates the state switchings of output terminals O1, O2, and O3 of any of coding blocks 38, 40, 42 according to the state switchings of its input terminal F. Whatever the rate at which the state of input terminal F switches, each of output terminals O1, O2, O3 switches state once every three state switchings of input terminal F, and only one of the three output terminals O1, O2, O3 switches state at once.

In the previously-described case where terminal FB switches state at a 200-MHz frequency, output terminals O1, O2, and O3 of coding block 40 each switch state at a 67-MHz frequency, smaller than the maximum 100-MHz frequency at which test terminals 301, 302, and 303 can operate.

Of course, the present invention is likely to have various alterations, modifications, and improvements which will readily occur to those skilled in the art. In particular, the present invention has been described in relation with a monitoring circuit which associates an additional output terminal to each area of the buffer memory to date each message written into the buffer memory, but those skilled in the art will easily adapt the present invention to a monitoring circuit which only associates an additional output terminal to certain areas of the buffer memory, to only date the messages written into said areas.

The present invention has been described in relation with a monitoring circuit which associates an area of the buffer memory to a message type, but those skilled in the art will easily adapt the present invention to a monitoring circuit which associates several areas of the buffer memory to a specific message type or to each message type.

The structure of the buffer memory used by a monitoring circuit according to the present invention has not been described, but those skilled in the art will easily adapt the present invention to any appropriate buffer memory structure, for example, a buffer memory of first-in/first-out type (FIFO). In such a case, each area of the buffer memory will be formed of a separate first-in/first-out memory.

The present invention has been described in relation with a coding block having three output terminals, to divide by three the state switching frequency of its output terminal, but those skilled in the art will easily adapt the present invention to any coding block comprising a number of output terminals adapted to a frequency division according to a different ratio; for example, 2 terminals for a division by 2, 4 terminals for a division by 4.

The present invention has been described in relation with a coding block having a specific operation, but those skilled in the art will easily adapt the present invention to any coding block having an equivalent coding function. For example, the coding block may provide through its output terminals a new value of a Gray code for each state switching of its input.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A monitoring device integrated on a chip of a microprocessor executing a sequence of instructions, comprising:
   a message calculation means for, on each execution of an instruction from among a plurality of instructions of predetermined instruction types, generating a digital message of a type from a plurality of types corresponding to the executed instruction, wherein the type of the digital message corresponds to a type of the executed instruction;
   a buffer memory of the monitoring device for storing each generated digital message; and
   a plurality of output terminals connected to an external analysis tool, each output terminal from the plurality of output terminals being associated with an instruction type from among the instruction types, wherein, simultaneously with storing in the buffer memory a digital message of a type from the plurality of types at a storage time, the type corresponding to the instruction type associated with an output terminal from the plurality of output terminals, the storage time is provided to the external analysis tool by modifying a state of the output terminal.

2. The monitoring device of claim 1, wherein the buffer memory is divided into a plurality of areas, each of the plurality of areas is associated with a different instruction type and is intended to only store digital messages associated with said instruction type.

3. The monitoring device of claim 1, wherein each output terminal is connected to a test terminal.

4. The monitoring device of claim 1, wherein each output terminal is connected to an input terminal of a coding block comprising a predetermined number of coding block output terminals, each of the coding block output terminals is connected to a test terminal, each coding block being provided to have each of its n coding block output terminals switch once every n state switchings of its input terminal and so that a single one of its n coding block output terminals switches state at once.

5. The monitoring device of claim 1, wherein only certain types of instructions are associated with an output terminal of the message calculation means.

6. The monitoring device of claim 1, wherein each of the predetermined instruction types is associated with an output terminal of the message calculation means.

7. An integrated circuit comprising:
a microprocessor for executing a sequence of instructions; and
a monitoring device for monitoring the execution of the sequence of instructions, the monitoring device comprising:
a message calculation means for generating digital messages of a plurality of types, wherein a type from the plurality of types of each digital message corresponds to a predetermined type of an instruction from a plurality of predetermined instruction types, and wherein the digital message of the type is generated on each execution of the instruction of the predetermined type;
a buffer memory for storing the generated digital messages; and
a plurality of output terminals connected to an external analysis tool, wherein an output terminal from the plurality of output terminals is associated with an instruction type, and wherein, simultaneously with storing in the buffer memory a digital message of a type from the plurality of types at a storage time, the type corresponding to the instruction type associated with an output terminal from the plurality of output terminals, the storage time is provided to the external analysis tool by modifying a state of the output terminal.

8. A method for monitoring a microprocessor executing a sequence of instructions by means of a device integrated to a microprocessor chip, the method comprising:
on each execution of an instruction from the sequence of instructions, generating a digital message of a type corresponding to a type of the executed instruction;
storing each generated digital message in a buffer memory;
simultaneously with storing in the buffer memory a first digital message of a first type corresponding to an instruction type associated with a first output terminal from a plurality of output terminals connected to an external analysis tool at a first storage time, providing the first storage time to the external analysis tool by modifying a state of the first output terminal; and
simultaneously with storing in the buffer memory a second digital message of a second type corresponding to an instruction type associated with a second output terminal from the plurality of output terminals at a second storage time, providing the second storage time to the external analysis tool by modifying the state of the second output terminal so that the external analysis tool determines a time elapsed between storing at the first storage time of the first digital message and storing at the second storage time of the second digital message.

9. The method of claim 8, wherein the buffer memory is divided into a plurality of areas, with each area from the plurality of areas storing digital messages associated with an instruction type.

10. The integrated circuit of claim 7, wherein the buffer memory is divided into a plurality of areas, with each area from the plurality of areas storing digital messages associated with an instruction type.

11. The integrated circuit of claim 7, wherein each output terminal is connected to a test terminal, the test terminal couples the output terminal to the external analysis tool.

12. The integrated circuit of claim 11, wherein a state of the test terminal is modified when a state of the output terminal connected to the test terminal is modified.

13. The integrated circuit of claim 7, wherein, when at least two instructions of a first and a second type from the sequence of instructions are executed in parallel, the message calculation means generates a digital message corresponding to an instruction of a first type and modifies a state of an output terminal associated with the instruction of the first type and simultaneously generates a digital message corresponding to an instruction of a second type and modifies a state of an output terminal associated with the instruction of the second type.

14. The integrated circuit of claim 7, wherein each output terminal is connected to an input terminal of a coding block comprising a predetermined number of coding block output terminals, each of the coding block output terminals is connected to a test terminal, wherein a state of a coding block output terminal switches once per a predetermined number of times a state of the input terminal switches, and wherein the predetermined number of the coding block output terminals switch states one at a time.

15. The integrated circuit of claim 7, wherein each output terminal from the plurality of output terminals is associated with a plurality of instruction types.

16. The integrated circuit of claim 7, wherein each instruction type is associated with an output terminal.

17. The monitoring device of claim 1, wherein
the plurality of output terminals are connected to the external analysis tool via a plurality of test terminals,
each output terminal from the plurality of output terminals is connected to a test terminal from the plurality of test terminals, and
a state of the test terminal is modified when a state of the output terminal connected to the test terminal is modified.

18. The monitoring device of claim 1, wherein, when at least two instructions of a first and a second type from the sequence of instructions are executed in parallel, the message calculation means generates a first digital message corresponding to an instruction of a first type and modifies a state of an output terminal associated with the instruction of the first type simultaneously with storing the first digital message in the buffer memory and simultaneously generates a second digital message corresponding to an instruction of a second type and modifies a state of an output terminal associated with the instruction of the second type simultaneously with storing the second digital message in the buffer memory.

19. The method of claim 8, wherein
the plurality of output terminals are connected to the external analysis tool via a plurality of test terminals,
each output terminal from the plurality of output terminals is connected to a test terminal from the plurality of test terminals, and
a state of the test terminal is modified when a state of the output terminal connected to the test terminal is modified.

* * * * *